E. SWANSON.
WALKING TRACTOR.
APPLICATION FILED JULY 3, 1915.
1,171,474.
Patented Feb. 15, 1916.
5 SHEETS—SHEET 1.
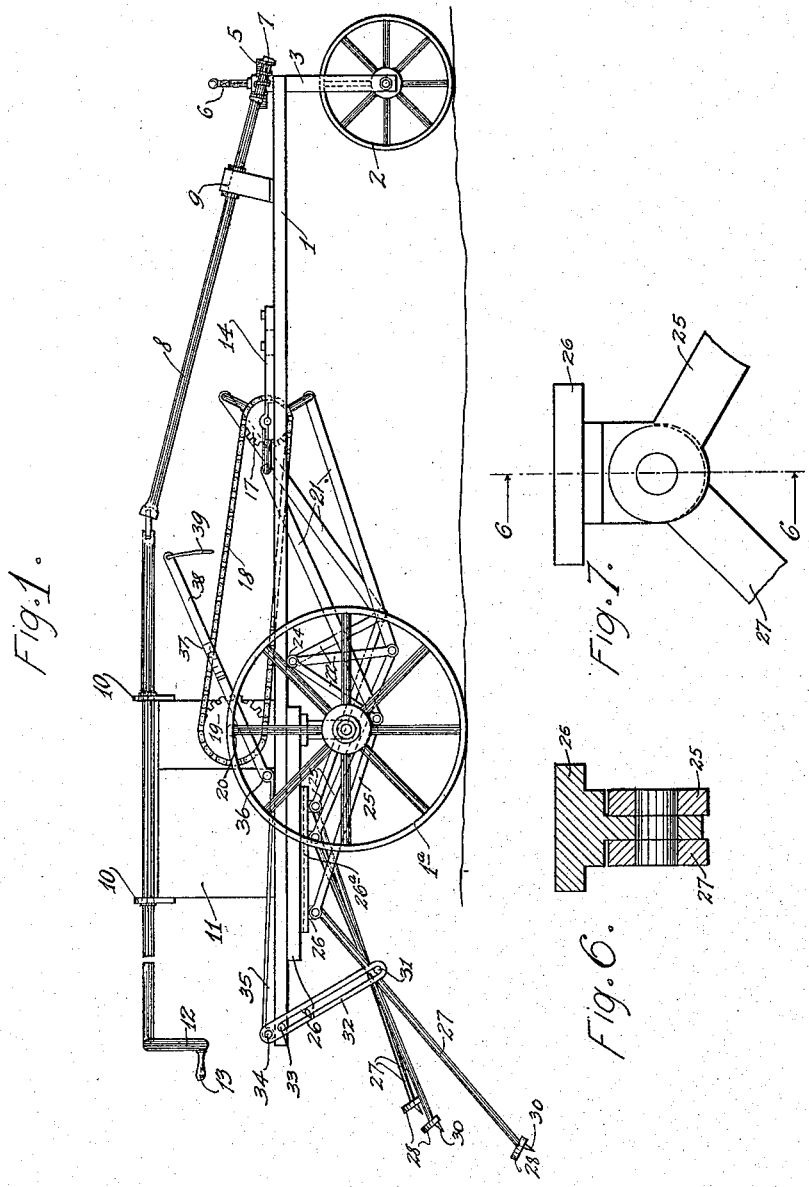
WITNESSES
INVENTOR

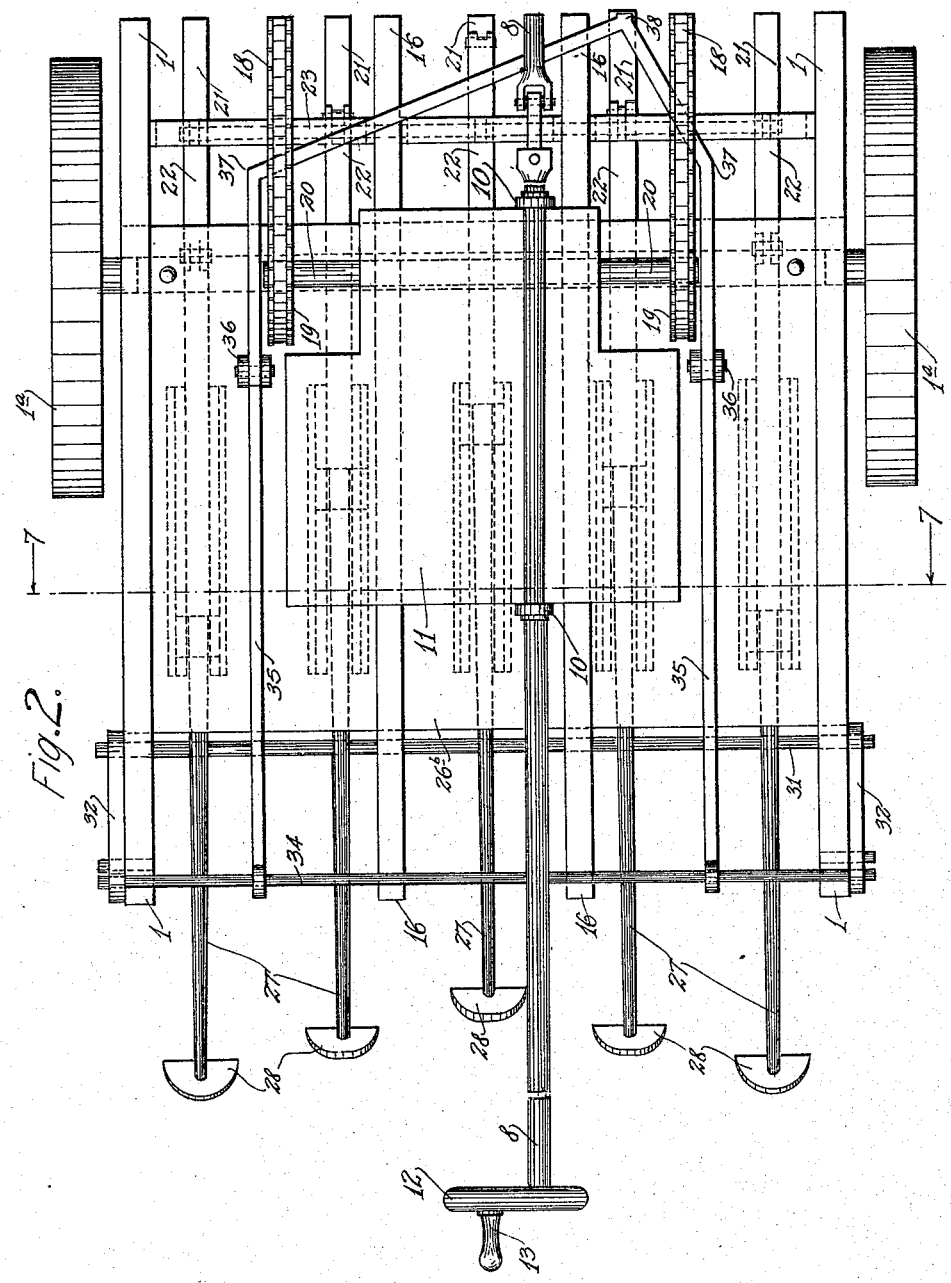

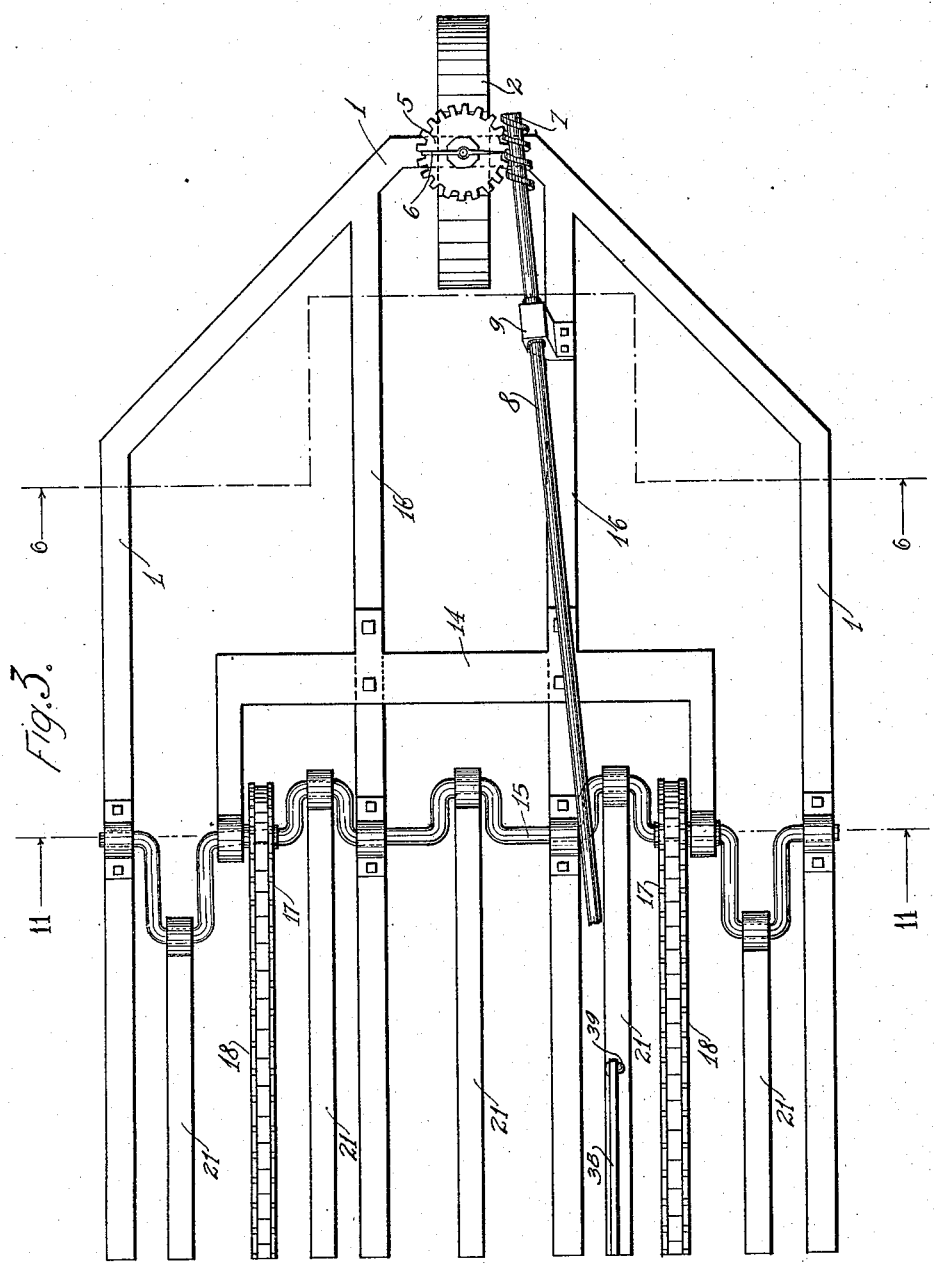

E. SWANSON.
WALKING TRACTOR.
APPLICATION FILED JULY 3, 1915.
1,171,474.
Patented Feb. 15, 1916.
5 SHEETS—SHEET 4.
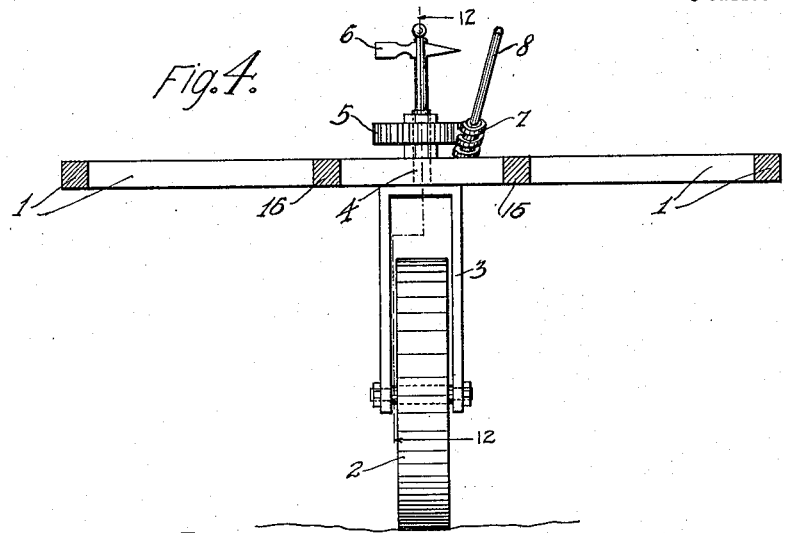
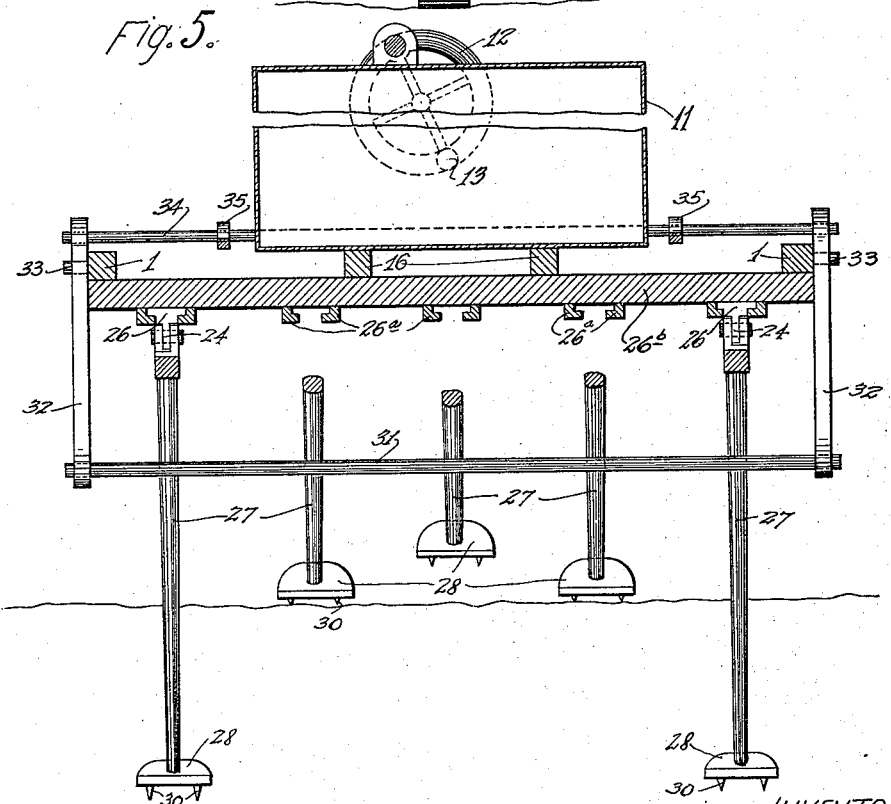
WITNESSES
Emil E. Hallenberg.
Paul A. Niersen
INVENTOR
Ed. Swanson
By H. J. Sanders Atty.

E. SWANSON.
WALKING TRACTOR.
APPLICATION FILED JULY 3, 1915.
1,171,474.
Patented Feb. 15, 1916.
5 SHEETS—SHEET 5.
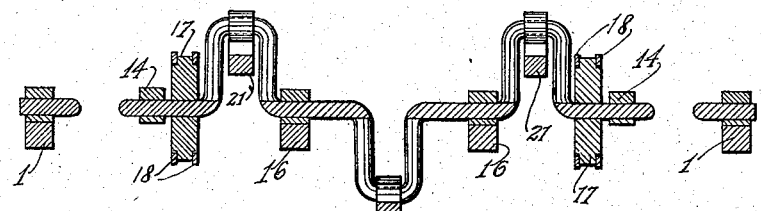
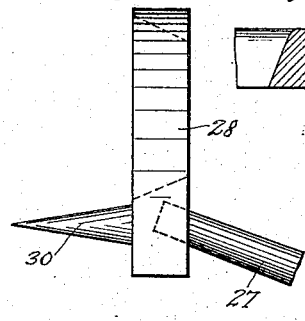
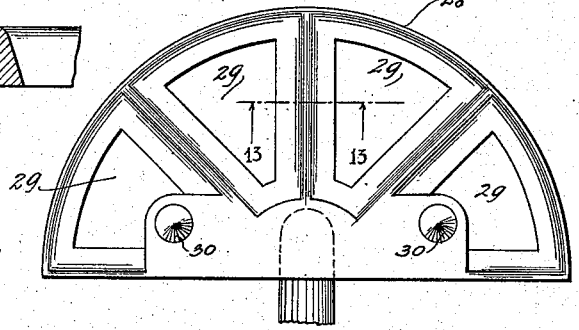
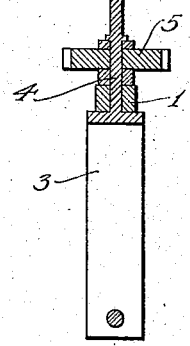

UNITED STATES PATENT OFFICE.

EDWARD SWANSON, OF HALLOCK, MINNESOTA.

WALKING-TRACTOR.

1,171,474. Specification of Letters Patent. Patented Feb. 15, 1916.

Application filed July 3, 1915. Serial No. 38,001.

*To all whom it may concern:*

Be it known that I, EDWARD SWANSON, a citizen of the United States, residing at Hallock, in the county of Kittson and State of Minnesota, have invented certain new and useful Improvements in Walking-Tractors, of which the following is a specification.

This invention relates to improvements in tractors and more particularly to what I prefer to call a walking tractor since the same is driven forward by means of adjustable bars pivotally carried which are reciprocated in a manner quite like the act of walking. The said bars are terminally provided with bearing plates that encounter the earth and literally bear against the same to thrust the machine forward; these bars taking the place of the ordinary traction wheels. The effect of driving this machine over ground to be seeded is to plow the ground and, in fact, a planter may be coupled to the walking tractor and the plowing and seeding performed simultaneously.

With the foregoing and other objects in view the invention consists in the combination and arrangement of parts to be hereinafter fully described in the following specification, pointed out in the appended claims and illustrated in the accompanying drawings which form a part of said specification and in which—

Figure 1 is a side view of my complete walking tractor. Fig. 2 is a plan view of the rear end of the machine. Fig. 3 is a plan of the front end of the machine. Fig. 4 is a cross section taken on line 6—6 of Fig. 3. Fig. 5 is a similar view taken on line 7—7 of Fig. 2. Fig. 6 is a vertical sectional detail taken on line 6—6 of Fig. 7. Fig. 7 is an enlarged detail view of the sliding shoe employed and portions of the shafts connected thereto. Fig. 8 is a section taken on line 11—11 of Fig. 3. Fig. 9 is a side view of one bearing plate employed. Fig. 10 is a section taken on line 13—13 of Fig. 11. Fig. 11 is a front elevation of a bearing plate. Fig. 12 is a section taken on line 12—12 of Fig. 4.

Like reference characters indicate corresponding parts throughout the several views.

My machine comprises the frame 1 provided with rear wheels 1ª and front wheel 2, the fork 3 of which carries the front end of the frame and which is formed with the post 4 that extends up through the frame and thereabove carries the crown wheel 5 and the arrow or indicator 6, said crown wheel being in engagement with a worm 7 carried on the steering rod 8 which is journaled in bearings 9 carried by the frame and in bearings 10 carried by the engine casing 11 and which is terminally provided with the wheel 12 having handle 13 to control said rod 8 and so guide the machine. The operator preferably walks behind or beside the machine and keeps in position to manipulate the steering mechanism although a seat may be provided at a convenient place upon the frame 1 if desired.

To the frame 1 an auxiliary frame 14 is secured, the ends of the same forming bearings for a crank shaft 15 which also obtains bearing upon the brace beams 16 of the main frame and said crank shaft is provided with the cogs 17, 17 which are connected by transmission chains 18, 18 with the driving gears 19, 19 mounted upon the engine shaft 20 whereby said crank shaft is driven. The crank shaft 15, further is provided with the pitmen 21 that extend below the frame 1 and are connected to the rockers 22 arranged on a transverse shaft 23 disposed in bearings 24 secured to the main frame, said rockers being also connected by rods 25 to the sliding shoes 26, arranged in the guide plates 26ª carried by the platform 26ᵇ secured to the frame 1, which carry the walking bars 27 which are provided at their lower ends with the semicircular bearing plates 28 formed with perforations 29 and provided on one face with the spikes 30. The said walking bars 27 may rest upon and are guided by the transverse rod 31 carried by the slotted plates 32 pivoted at 33 to the frame 1 and connected by the transverse rod 34 which is controlled by the lift rods 35, 35 which are fulcrumed in bearings 36, 36 carried by the main frame; said rods 35, 35 being bent abruptly toward each other at points 37, 37 and merged into the lever 38 which is provided at its free end with a suitable rope 39 by means of which it may be moved in a vertical plane to cause its connections to raise or lower the slotted plates 32 to regulate the angle of the walking bars 27 with the frame 1 to limit the driving power of said bearing plates.

Rotation of the engine shaft 20 will operate the drive gears 19 and transmission chains 18 which, through the medium of the cogs 17, will drive the crank shaft 15 which will impart a reciprocating motion to the pitmen 21 and rockers 22 and rods 25, sliding the shoes 26 in the plates 26ª and raising and lowering the walking bars 27 over the rod 31 carried by the plates 32.

When the spikes 30 of the bearing plates encounter the earth they tend to break and harrow the same and at the same time they impel the machine forward, the several walking bars with their bearing plates operating consecutively keep the machine in motion.

What is claimed is:—

1. In a walking tractor, a main frame, a power-driven crank shaft carried by said main frame, slotted guide plates carried by said main frame, shoes arranged in said slotted guide plates, walking bars carried by said shoes, transmission mechanism connecting said shoes and the aforesaid crank shaft, bearing plates carried by said walking bars and means pivotally carried by said frame and engaging said walking bars for supporting and guiding the latter members.

2. In a walking tractor, a main frame, a power-driven crank shaft carried by said main frame, slotted guide plates carried by said main frame, shoes slidably arranged in said slotted guide plates, rockers carried by said main frame, connection between said rockers and said sliding shoes, connection between said rockers and the said crank shaft, walking bars carried by said shoes, bearing plates carried by said walking bars and means pivotally carried by said frame and engaging said walking bars for supporting and guiding the latter members.

3. In a walking tractor, a main frame, a power-driven crank shaft carried by said main frame, slotted guide plates carried by said main frame, shoes arranged in said slotted guide plates, transmission mechanism connecting said shoes and said crank shaft, walking bars carried by said shoes, bearing plates carried by said walking bars, slotted plates pivotally carried by said frame and a rod connecting said slotted plates and engaging said walking bars.

4. In a walking tractor, a main frame, a power-driven crank shaft carried by said main frame, slotted guide plates carried by said main frame, shoes slidably arranged in said slotted guide plates, transmission mechanism connecting said shoes and said crank shaft, walking bars carried by said shoes, bearing plates carried by said walking bars, slotted plates pivotally carried by said frame, a rod connecting said slotted plates and engaging said walking bars and manually operable means connecting said slotted plates for raising and lowering the same to vary the inclination of said walking bars with said frame.

In testimony that I claim the foregoing as my own I have hereto affixed my signature in the presence of two subscribing witnesses.

EDWARD SWANSON.

Witnesses:
A. Z. BENNETT,
H. B. BORNEMAN, Jr.

Copies of this patent may be obtained for five cents each, by addressing the "Commissioner of Patents, Washington, D. C."